Aug. 17, 1965    A. M. SASANKO    3,200,437
APPARATUS FOR RENDERING POLYSTYRENE SHEET MATERIAL FLEXIBLE
Filed Feb. 16, 1962    2 Sheets-Sheet 1
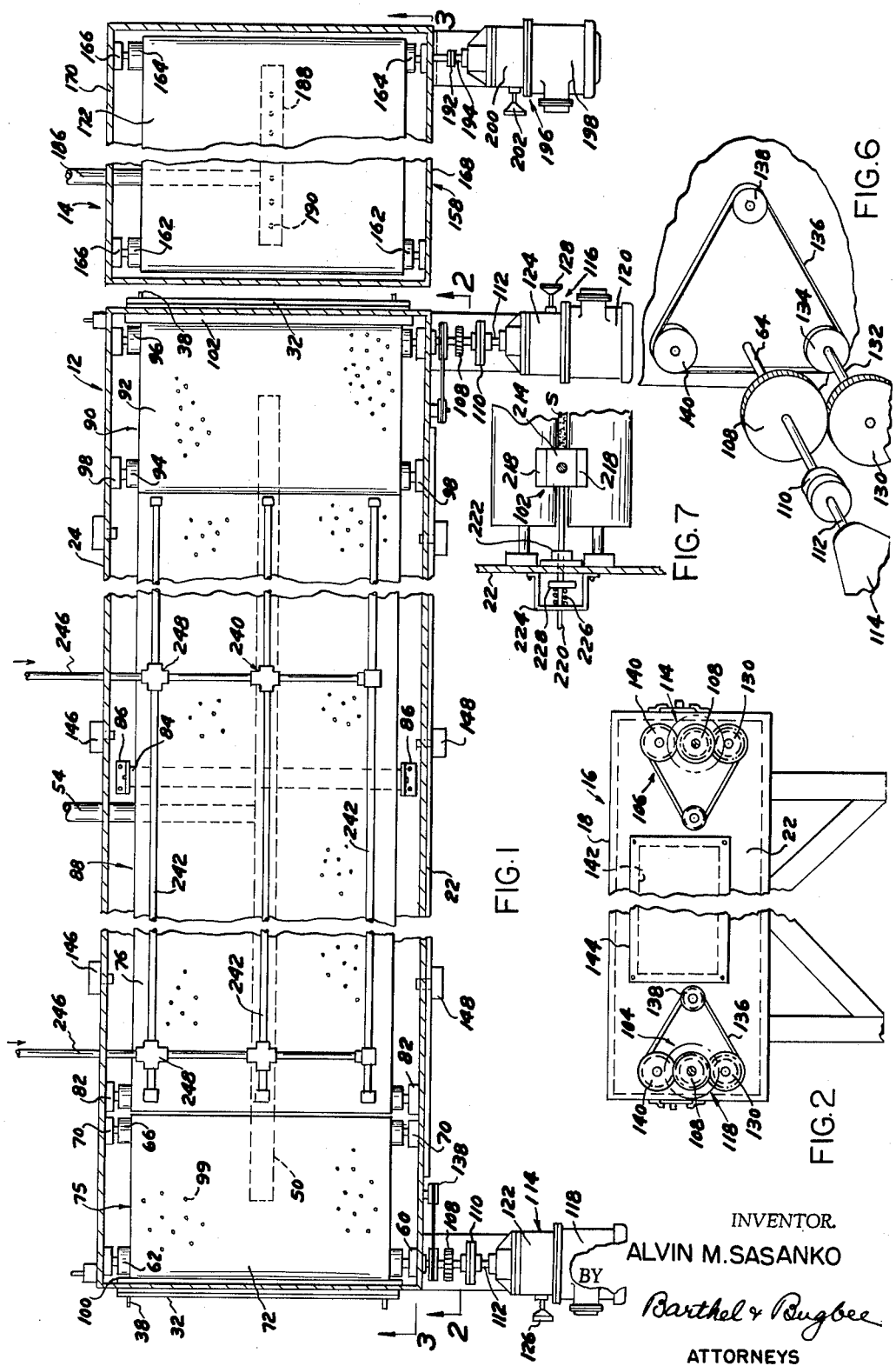
INVENTOR.
ALVIN M. SASANKO
BY
Barthel & Bugbee
ATTORNEYS Aug. 17, 1965 A. M. SASANKO 3,200,437
APPARATUS FOR RENDERING POLYSTYRENE SHEET MATERIAL FLEXIBLE
Filed Feb. 16, 1962 2 Sheets-Sheet 2
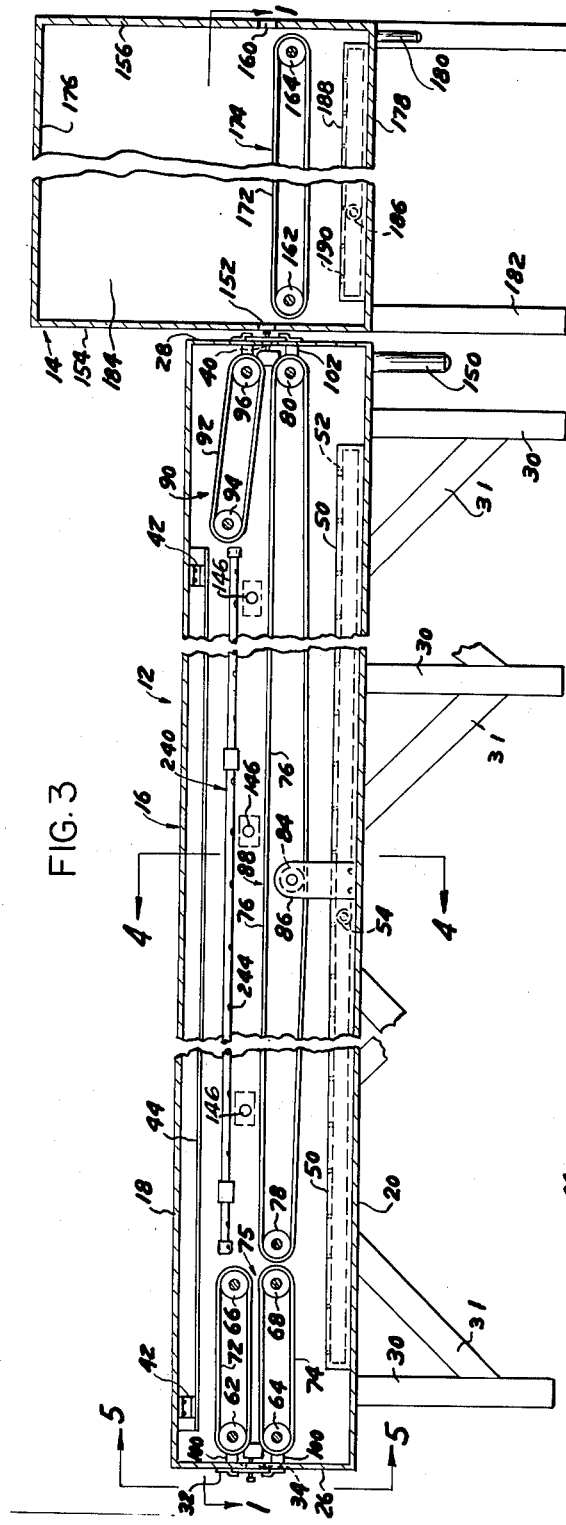
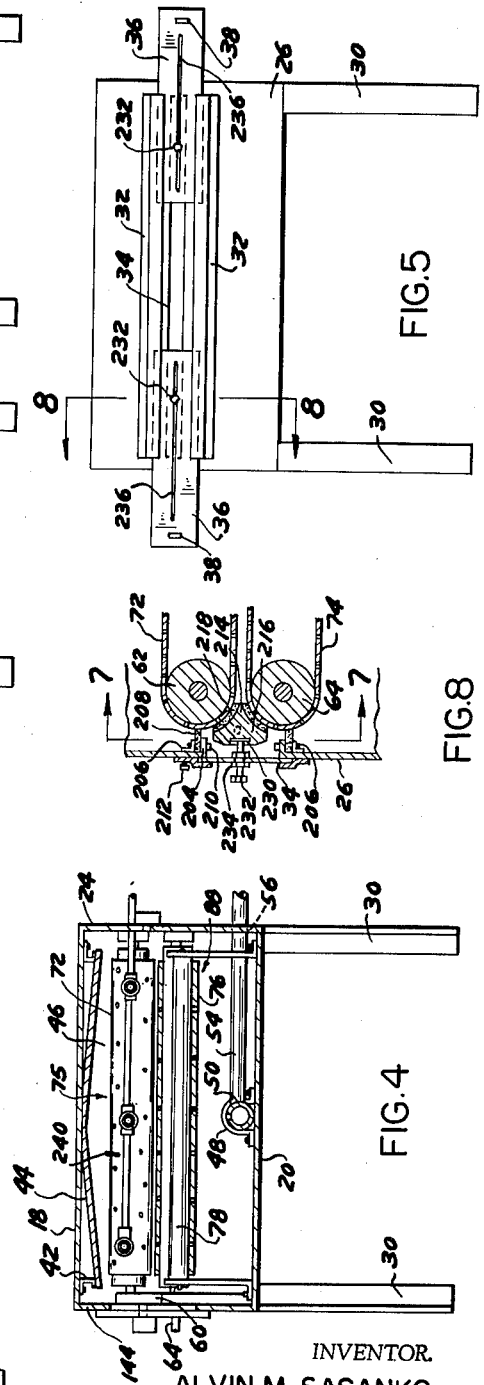
INVENTOR.
ALVIN M. SASANKO.
BY
Barthel & Bugbee
ATTORNEYS.

United States Patent Office 3,200,437
Patented Aug. 17, 1965

3,200,437
APPARATUS FOR RENDERING POLYSTYRENE SHEET MATERIAL FLEXIBLE
Alvin M. Sasanko, Allen Park, Mich., assignor to Swedish Crucible Steel Company, Detroit, Mich., a corporation of Michigan
Filed Feb. 16, 1962, Ser. No. 173,739
10 Claims. (Cl. 18—1)

This invention relates to an apparatus for producing flexible polystyrene plastic sheets.

Hitherto, expanded polystyrene pastic sheets have been manufactured by forming the sheets from polystyrene beads in densities ranging from one-half pound to two pounds per cubic foot. Such expanded polystyrene plastic sheets as hitherto made, however, are stiff and brittle so that their use, such as for insulation purposes, has had to be confined to uses where the sheet is not flexed. This limitation of lack of flexibility has greatly restricted the use of such sheets, which otherwise possess execellent insulation properties, and has prevented effective use of the sheet for other purposes requiring flexibility, such as, for example, wrapping, packing, pads for carpets and rugs, or cushioning articles for shipment.

The present invention provides an apparatus for processing such expanded polystyrene plastic sheets to remove its rigidity and brittleness and to impart flexibility to it, and does so upon a mass production basis.

Accordingly, one object of the present invention is to provide an apparatus for rendering expanded polystyrene sheet material flexible.

Another object is to provide an apparatus which is adapted to be operated continuously upon a mass production basis.

Another object is to provide such an apparatus which is adapted to render expanded polystyrene sheet material flexible over a wide density range, such as, for example, from one-fourth pound to two pounds per cubic foot.

Another object is to provide such an apparatus which imparts such a resiliency to the sheet that it not only renders the sheet flexible but also of a kind which eventually recovers its original shape even though compressed by as much as twenty percent from its original volume.

Other objects and advantages of the invention will become apparent during the course of the following description of the accompanying drawings, wherein:

FIGURE 1 is a horizontal section through an apparatus for removing the usual brittleness from expanded polystyrene sheet plastic material and rendering it flexible, according to one form of the invention, taken along the line 1—1 in FIGURE 3;

FIGURE 2 is a side elevation of the end portions of the apparatus shown in FIGURE 1, partly in vertical section along the line 2—2 in FIGURE 1, showing the driving mechanism with the driving motors and reduction gearing omitted and with the central portion of the machine omitted to conserve space;

FIGURE 3 is a vertical section taken along the line 3—3 in FIGURE 1;

FIGURE 4 is a vertical cross-section taken along the line 4—4 in FIGURE 3, with the driving motor and driving mechanism omitted to simplify the showing;

FIGURE 5 is a rear end elevation of the apparatus taken along the line 5—5 in FIGURE 3;

FIGURE 6 is a diagrammatic perspective view of one of the conveyor-supporting drum-driving units;

FIGURE 7 is a fragmentary vertical section taken along the line 7—7 in FIGURE 8, just inside the entrance wall, showing the sheet edge sealing device; and FIGURE 8 is a vertical section taken along the line 8—8 in FIGURE 5, showing in cross-section the mechanism of FIGURE 7.

Referring to the drawings in detail, FIGURES 1, 2 and 3 show a plastic sheet material processing aparatus, generally designated 10, according to one form of the invention adapted for the continuous mass production treatment of expanded polystyrene plastic sheet material such as that made from polystyrene plastic beads, for removing its inherent brittleness and inflexibility and rendering it pliable and flexible, as well as to impart recoverability to it after compression. The apparatus 10 is broadly subdivided into the two machines, generally designated 12 and 14 respectively, shown at the left and right-hand sides of FIGURES 1 and 3 the flexibility machine 12 rendering the sheet material pliable and the machine 14 being a recovery unit which facilitates the recovery of the sheet plastic material to its original thickness after it has been compressed between the rolls employed in the flexibility machine 12. It will be observed that in FIGURES 1, 2 and 3, certain portions of the machine have been omitted to enable the showing of the apparatus upon a larger scale than would be possible by including the entire apparatus, because of its great length. For example, the flexibility machine 12 may have a length of twenty feet or more, a width of five feet or more and a height of two feet or more.

The flexibility machine 12, so called because it imparts flexibility or resiliency to the expanded polystyrene plastic sheet material, receives the brittle expanded polystyrene sheet material at its left-hand or rearward end from the conventional apparatus, briefly described preceding the statement of objects herein. The flexibility machine 12 includes a housing, generally designated 16, having top and bottom walls 18 and 20 respectively, front and rear side walls 22 and 24 (FIGURE 4) and entrance and exit end walls 26 and 28 respectively. The housing 16 is in the shape of an elongated substantially steam-tight box supported in any suitable manner, the legs 30 being shown in simplified form with braces 31.

The entrance end wall 26 (FIGURES 1, 3 and 5) has spaced parallel horizontal guide bars 32 of approximately Z-shaped cross-section mounted above and below a horizontally-elongated entrance opening 34 in the form of an elongated slot. Slidably mounted in the guide bars 32 are sliding closures or doors 36 by means of which the lateral width of the entrance opening or slot 34 may be varied in order to adjust it to different widths of sheet material being processed. Handles 38 on the sliding doors or closures 36 enable the latter to be moved inward or outward to narrow or widen the entrance opening 34, as desired. The outlet or exit end wall 28 is similiarly constructed (FIGURES 1, 2 and 3) so as to be a substantial duplicate of the construction shown for the inlet or entrance end wall 26 in FIGURE 5, hence corresponding parts bear the same reference numerals, except that the exit opening has been designated by the different reference numeral 40 to distinguish it in the description of the operation of the invention.

Secured to the under side of the top wall 18 of the housing 16, as by the depending angle brackets 42 (FIGURE 4) is a shallow V-shaped condensate deflector 44 which extends approximately the entire length of the housing 18 and also substantially the entire width. This condensate reflector 44 is shaped like a shallow or low roof of V-shaped cross-section and, as stated in the description of the operation of the invention, has the function of shielding the plastic sheet material being processed from the water drops which would otherwise condense on the under side of the top wall 18 and would drip therefrom onto the plastic sheet material.

In order to supply a hot gaseous processing agent, such as live steam, to the processing chamber 46 within the housing 16, the bottom wall 20 of the latter carries arcuate holdown brackets 48 (FIGURE 4) bolted or otherwise secured to the bottom wall 20 and extending over and holding down an elongated steam distributing pipe 50 having closed opposite ends and provided with steam escape holes 52 arranged at intervals in spaced relationship along its entire length. Connected to the steam distributing pipe 50, for example near its midpoint, is a steam supply pipe 54 which passes through a hole 56 in the rearward side wall 24 and is connected to a suitable conventional steam generator, such as a boiler (not shown). Steam pressures up to approximately thirty pounds per square inch are maintained within the processing chamber 46.

Mounted adjacent the entrance opening 34 in the entrance end wall 26 in bearing brackets 58 secured to the rear side wall 24 and in a bearing bracket 60 extending inward from the bottom wall 20 adjacent the front side wall 22 are shaft-mounted upper and lower conveyor belt driving drums 62 and 64. Spaced horizontally apart from these are correspondingly-arranged shaft-mounted idler drums 66 and 68 rotatably supported in bearing hangers 70 (FIGURE 1). Trained around the upper drums 62, 66 and lower drums 64, 68 are upper and lower endless sheet-feeding and sealing belts 72 and 74 respectively (FIGURE 3) which constitute an auxiliary sheet feeding and sealing conveyor, generally designated 75. The latter receives the substantially rigid and brittle plastic sheet to be processed through the entrance opening 34 and delivers it to a main endless conveyor belt 76 similarly trained around shaft-mounted drums 78 and 80 near the opposite ends of the housing 16. The forward and rearward main conveyor drums 78 and 80 are similarly mounted in bearing hangers or brackets 82 (FIGURE 1). The lower courses of the main conveyor belts 76 are engaged by a shaft-mounted holddown roller 84 (FIGURE 1, 3 and 4) mounted in longitudinally-spaced upstanding bearing brackets 86 bolted or otherwise secured to the lower wall 20 of the housing 16. The main conveyor belt 76 and its above-mentioned associated machine elements constitute a main processing conveyor, generally designated 88.

Arranged above the discharge end of the main conveyor belt 76 adjacent the belt-supporting drum 80 adjacent the exit opening 40 is an endless delivery and sealing conveyor, generally designated 90. The latter consists of an endless conveyor belt 92 trained around forward and rearward shaft-mounted conveyor supporting drums 94 and 96 (FIGURES 1 and 3), mounted in bearing hangers or brackets 98. The plane containing the axes of the delivery conveyor supporting drums 94 and 96 is inclined slightly downward toward the delivery opening 40 in the exit wall 28 so as to cause the lower courses of the delivery conveyor belts 92 to converge toward the main or treating conveyor belt 76. The conveyor supporting drums 62, 64, 66, 68, 78, 80, 94 and 96 are coated with elastomeric material, such as synthetic rubber, to give them a slightly yielding and sealing grip upon the sheet plastic material being treated. The endless conveyor belts 72, 74, 76 and 92 are preferably perforated with multiple holes 99 (FIGURES 1 and 4) so as to support the plastic sheet while enabling the major portions of their upper and lower surfaces to be exposed to the treatment imparted by the gaseous processing fluid, such as steam.

The belts 72 and 74 of the sheet feeding and sealing conveyor 75 and the belts 76 and 92 of the main conveyor 88 and delivery conveyor 90 respectively are engaged by resilient sealing bar structures 100 and resilient sealing devices 102 respectively (FIGURES 1 and 3) which are described below and which are mounted on the entrance end wall 26 and exit or outlet end wall 28 respectively above and below the entrance opening 34 and exit or discharge opening 40. These sealing bar structures 100 and sheet edge sealing devices 102, as their name indicates, exert a light sealing pressure upon the belts 72, 74, 76 and 92 where they pass over the rollers 62, 64, 80 and 96 and substantially seal the peripheries of these rollers between the belts just mentioned.

The feeding conveyor 75 near the entrance end wall 26 of the machine and the main or processing conveyor 88 and delivery conveyor 90 near the exit or outlet end wall 28 are driven by somewhat similar driving units, generally designated 104 and 106 respectively. The driving units 104 and 106 have certain similar components which, where similar, are designated with the same reference numerals. The outer ends of the shafts of the drums 64 and 80 carry gears 108 (FIGURES 2 and 6) and continue outward through couplings 110 (FIGURE 1) to the output shafts 112 of infinitely-variable-speed motor-driven reduction gear sets 114 and 116 respectively. Each motorized reduction gear set 114 or 116 consists of an electric motor 118 or 120 directly and drivingly connected to an infinitely-variable reduction gear box 122 or 124, the speeds of which are regulated by hand wheels 126 or 128 to vary the speeds of the output shafts 116 and therefore vary the speeds of the lower drums 64 and 80. The gears 108 mesh with equally-toothed gears 130 mounted on shafts 132 carrying pulleys or sprockets 134 journaled in the front side wall 22 of the housing 16. The pulley or sprocket 134 in turn drives a belt or sprocket chain 136, the three courses of which are arranged in an approximately triangular path. The belt or sprocket chain 136 passes around an idler pulley or sprocket 138 journaled in the housing side wall 22, thence around a pulley or sprocket 140 mounted on the shaft of the upper drum 62 of the feeding conveyor 75 or the upper drum 96 of the delivery conveyor 90, and thence back around the pulley or sprocket 134. In this manner, the pairs of conveyor-supporting drums 62, 64 and 96, 80 are driven in synchronism in the proper directions. The driving units 104 and 106 face in opposite directions, as seen in FIGURE 2. The front side wall 22 which carries the bearings for the units 104 and 106 is provided with an access opening 142 (FIGURE 2) closed by an access closure plate 144 bolted or otherwise secured to the side wall 22.

In order to prevent "humping up" of the sheet material while it is being conveyed during treatment by the main conveyor belt 76, photo-cells 146 are mounted on the rear side wall 24 of the housing 16. The photo-cells 146 are disposed at intervals along the path of the upper course of the main conveyor belts 76 on light paths disposed close to but spaced slightly above these upper courses, so that if the sheet material humps upward from the belts 76, it interrupts the light beam from light sources 148 mounted on the front side wall 22 of the housing 16 in alignment with the photo-cells 146 and with the light beams therefrom disposed in substantially the same horizontal plane. The light sources 148 are conventional and are connected to a suitable source of electric current (not shown). The photo-cells 146 are also conventional and are connected through a conventional speed control circuit (not shown) to the driving motor 120 of the motorized variable reduction gear set 116. Such control circuits are well known to electrical and electronics engineers and are beyond the scope of the present invention.

The bottom wall 20 of the housing 16 is inclined slightly downward at an approximately one percent gradient from the entrance end wall 26 to the exit end wall 28 (FIGURE 3). This angle of inclination is too slight to be indicated in a drawing of the scale of FIGURE 3. The purpose of this inclination of the lower wall 20 of the housing 16 is to cause condensate from the sheet-treating fluid, such as steam, to flow downward under the influence of gravity to a condensate discharge pipe 150 located adjacent the junction of the exit end wall 28 with the bottom wall 20 (FIGURE 3).

The treated plastic sheet material, after final compression between the conveyor belts 92 and 88 as they pass around their respective drums 96 and 80 passes outward through the exit opening 40 and through the therewith aligned entrance opening 152 of the recovery machine 14. The recovery machine 14 has entrance and exit end walls 154 and 156 in its housing 158, the former containing the entrance opening 152 aligned with the exit opening 40 and the latter containing the exit or discharge opening 160. The recovery machine housing 158 is of any suitable length sufficient to impart the desired degree of recovery to the plastic sheet material and contains entrance and exit conveyor-supporting shaft-mounted drums 162 and 164 respectively (FIGURES 1 and 3) journaled in bearing hangers or brackets 166 bolted to the forward and rearward side walls 168 and 170 (FIGURE 1) of the recovery machine housing 158. Trained around the conveyor supporting drums 162 and 164, which are located approximately on the same level as the conveyor supporting drums 78 and 80 of the sheet treating machine 12 are laterally-spaced endless conveyor belts 172 which, with their supporting drums 162 and 164 constitute a recovery conveyor, generally designated 174. The recovery machine housing 158 has top and bottom walls 176 and 178 respectively, the latter, like the bottom wall 20 of the flexibility machine housing 16, being inclined downwardly toward the entrance to a condensate drain pipe 180 (FIGURE 3). The housing 158 is supported in any suitable way, such as by legs 182 secured to the bottom wall 178. Live steam is supplied to the recovery chamber 184 through a steam supply pipe 186 (FIGURE 1) from a suitable steam generator, such as a steam boiler. The steam supplied by the supply pipe 186 is distributed by a longitudinally-disposed steam distribution pipe 188 connected to the supply pipe 186 and mounted on or near the floor or bottom wall 178 of the housing 158. Longitudinally-spaced multiple holes 190 in the top of the steam distribution pipe 188 permit escape of the steam at various locations throughout the length of the recovery housing 158. The steam within the recovery chamber 184, however, is substantially at atmospheric pressure in contrast to the much higher steam pressure of up to thirty pounds per square inch within the processing chamber or flexibility machine housing chamber 46.

In order to drive the recovery conveyor 174, one of its drums, such as the drum 164, is coupled at 192 to the output shaft 194 of an infinitely-variable-speed motor-driven reduction gear set 196 similar to the motor-driven reduction gear sets 114 and 116 and similarly constructed and arranged. As before, the gear set 196 includes an electric motor 198 directly and drivingly connected to an infinitely-variable reduction gear box 200, the speed of which is regulated by a hand wheel 202 to vary the speed of the output shaft 194 and thus to vary the speed of the recovery conveyor 174. In this manner, the speed of the recovery conveyor 174 is adapted to conform to the speed of the processing conveyor 88.

Each sealing bar structure 100 consists of a supporting plate or flange 204 extending inwardly from the upper and lower edges of the entrance opening 34 from the entrance end wall 26. Bolted to the flanges 204 between the latter and angle retaining plates 206 are resilient sealing members 208 made of any suitable yieldable material, matted fibrous gasketing material such as felt having been found suitable for this purpose. The flanges 204 are slotted for adjustment of the bolts 210, sealing members 208 and angle members 206 toward and away from the drums 62 and 64 so as to adjustably regulate the pressure of the sealing member 208 against the conveyor belts 72 and 74 and to take up wear. Stop screws 212 are threaded through the front wall 20 into engagement with the angle members 206 so as to prevent their being pushed backward and to precisely regulate and hold the adjustment.

The sheet edge sealing devices 102 (FIGURES 7 and 8) are two in number, located near the opposite ends of the rollers 62 and 64 and disposed in the space between these rollers. Each of the two sheet edge sealing devices 102 (FIGURES 7 and 8) consists of a roughly wedge-shaped movable block 214 having concave cylindrical upper and lower surfaces 216 (FIGURE 8), each having the extent approximately a quarter of a full cylinder. Secured as by cementing, vulcanizing or the like to the concave surfaces 216 are similarly concave cylindrical sealing pads 218 likewise of suitable yielding material such as matted fibrous gasketing material, for example, felt; the curvatures of the cylindrical surfaces 216 and the corresponding surfaces of the pads 218 are such as to be substantially concentric with the rollers 62 and 64 so as to fit into the space between them and engage their respective conveyor belts 72 and 74.

Each of the pads 218 and blocks 214 at their facing ends engages the opposite edges of the plastic sheet S being processed (FIGURE 7) so as to prevent them from being thinned into wedge-shaped form, which would otherwise occur were the opposite edge portions of the plastic sheet S free to expand laterally as the sheet S enters the space between the portions of the upper and lower belts 72 and 74 passing around the entrance rollers 62 and 64.

In order to adapt the sheet edge sealing devices 102 to different widths of plastic sheets S, each of the blocks 214 is mounted on a rod 220 which in turn passes slidably through a bearing block 222 (FIGURE 7) and a U-shaped bracket 224 bolted or otherwise secured to opposite sides of the respective side walls 22 and 24. Only the side wall-mounted edge sealing device 102 attached to the side wall 22 is shown in FIGURES 7 and 8, but it will be understood that the companion sealing device 102 is of similar construction and extends inwardly in the opposite direction from the opposite side wall 24. Mounted on the portion of the rod 220 between the wall 22 and bracket 224 is a compression spring 226 which engages a collar 28 secured as by a set screw (not shown) to the rod 220 and in this manner urging the rod 220 and block 214 into yielding and adjustable contact with the edge of the plastic sheet S. Each of the blocks 214 is T-slotted laterally to slidably receive a correspondingly-sized disc 230 (FIGURE 8) mounted on the end of an adjusting screw 232 threaded through a threaded annularly grooved collar 234 slidably engaging an elongated slot 236 (FIGURE 5) in each of the sliding doors or closures 36.

In order to hold the entering portion of the plastic sheet S down against the upper course of the main conveyor belt 76 and thereby prevent humping thereof during such insertion, there is additonally provided a compressed air holddown arrangement, generally designated 240 (FIGURES 1, 3 and 4.) This consists of a network or gridiron arrangement of longitudinal pipes 242 perforated on their lower sides at 244 (FIGURE 3) and extending in laterally-spaced parallel relationship lengthwise of the upper portion of the housing 16 immediately between the condensate deflector 44 and the upper course of the main conveyor belt 76. Three such pipes 242 are shown in FIGURE 1, one each near the outer edges of the belt 76 and the other midway between them. These longitudinal pipes 242 are supplied with compressed air by transverse compressed air supply pipes 246 connected thereto at intervals along their lengths, so as to insure that sufficient compressed air at a high enough pressure is supplied to all portions of the pipes 242 and at the same time compensation is made for the pressure drop between the locations or couplings 248 at which the supply pipes 246 are connected to the longitudinal pipes 242.

In the operation of the invention, let it be assumed that steam has been supplied to the processing chamber 46 of the flexibility machine housing 16 and has been built up to the desired pressure up to thirty pounds per square inch from the supply pipe 54 and the distribution pipe 50. This desired pressure is dependent upon the thickness of the sheet plastic material being treated and the speed at which it is moved through the flexibility machine 12 by the processing conveyor or main conveyor 88. At the same time, steam at approximately atmospheric pressure is supplied to the chamber 184 of the recovery machine 14 through the supply pipe 186 and distribution pipe 188.

The relatively stiff and brittle sheet S of expanded polystyrene plastic sheet material is then preferably fed through the entrance or inlet opening 34 into the space between the upper and lower conveyor belts 72 and 74 of the feeding conveyor 75. Here it is subjected to the action of the edge sealing devices 102, the blocks 214 of which prevent thinning of the edge portion of the sheet S. At the same time, the bar structures 100 engage the upper and lower belts 72 and 74 as they pass around the rollers 62 and 64, thereby exerting a sealing contact to minimize steam leakage when the steam is turned on. The sheet moves between the adjacent courses of the conveyors 72 and 74 and is deposited by them upon the main or processing conveyor 88.

As the end portion of the sheet emerges from between the adjacent courses of the conveyors 72 and 74, the compressed air is supplied through the supply pipes 246 to the perforated longitudinal pipes 242, issuing therefrom through the holes 244 in the inner sides thereof in air blasts which press the plastic sheet S downward against the upper course of the main conveyor belt 76 while it is moved therealong. When the end of the plastic sheet S has passed beneath the belt 92 of the conveyor 90 and beneath the roller 94 thereof, the compressed air, having performed its press-down function upon the forward portion of the plastic sheet S is shut off and the steam under pressure supplied to the housing chamber 46 through the steam distributing pipe 50, escaping through its holes 52. Meanwhile, as the plastic sheet S moves along the top of the conveyor belt 76, it is subjected to the action of the steam under pressure in the housing chamber 46, the steam causing it to acquire a permanent flexibility. The perforations 99 in the main conveyor belt 76 enable the steam under pressure to reach the major part of both sides of the plastic sheet as it is moved along them, so that treatment is substantially complete. The small areas of the sheet resting upon the upper course of the belt 76 between the perforations 99 is reached by steam either from the top of the sheet or penetrating between the sheet and the belt by reason of its pressure.

In the meantime, as the plastic sheet passes through the housing chamber 46 in the above-described manner, the steam acts on the blowing agent such as pentane, inside the plastic beads which compose the sheet S, causing expansion of the blowing agent and moisture inside the beads. This in turn decreases the density of the plastic sheet S as the material thereof expands, thereby giving a greater output, in square feet, than that fed into the machine. The increase in square footage of material coming out of the machine, over that being fed into the machine, can be as high as twenty (20%) percent, depending upon the type of end product desired. From experience it has been found that the density of about two pounds per cubic foot is most suitable for insulating purposes.

As the plastic sheet reaches the end of the upper course of the belts 76, it is engaged by the lower course of the belt 92 of the endless delivery and sealing conveyor 90 and slightly compressed as it is ejected through the exit or outlet opening 40. The compressing action exerted on the plastic sheet S as it passes between the portions of the belts 92 and 76 rounding the rolls 96 and 80 respectively fractures the plastic beads of which the plastic sheet S is composed. This fracturing action greatly reduces subsequent shrinkage of the beads by the cooling and condensation of the moisture therein producing a partial vacuum, and also renders the sheet S flexible.

After the sheet S emerges from the exit or outlet opening 40 of the housing 16, it immediately enters the recovery chamber 184 of the recovery housing 158 through the entrance opening 152 and is deposited upon the recovery conveyor belt 172. The latter conveys the somewhat compressed sheet toward the outlet opening 160 while it is subjected to steam at approximately atmospheric pressure. In the meantime, the sheet plastic material gradually expands by reason of its inherent resilience and by the time it reaches the outlet opening 160, it has substantially recovered its original thickness. In other words, the provision of the recovery machine 14 enables the now-flexible expanded polystyrene sheet material to regain the approximate thickness which it had prior to its compression between the feeding conveyor belts 72 and 74 of the feeding conveyor 75 and between the main conveyor belt 76 and the delivery conveyor belt 92.

The hand wheels 126, 128 and 202 of the motorized variable speed gear sets 114, 116 and 196 are adjusted by the operator until the various conveyor belts which they drive, as described above, travel at speeds found satisfactory for imparting the desired degree of flexibility to the expanded polystyrene plastic sheet material and to convey it through the recovery chamber 184 at a speed conforming to the speed of the main or processing conveyor 88. Meanwhile, if the plastic material humps up while it is traversing the main conveyor belt 76 of the main or processing conveyor 88 by reason of its being deposited thereon by the feeding conveyor 75 faster than the main conveyor 88 can carry it away, the humped portion intercepts the light beam between one of the light sources 148 and photo-cells 146, setting in operation the control circuit which speeds up the motor 120 of the motorized variable reduction gear set 116 so that the main conveyor belt 76 temporarily travels faster than the feeding conveyor belts 72 and 74 of the feeding conveyor 75 are depositing the sheet S thereon. This action thus flattens out the plastic sheet material and thereby compensates for and eliminates such humping. In this manner, the plastic sheet material is maintained constantly in a substantially flat condition as it is carried through the processing chamber 46 of the flexibility machine 12 by the processing conveyor 88.

What I claim is:

1. An apparatus for rendering expanded polystyrene sheet material flexible, comprising
    an elongated approximately pressure-tight housing having an inlet opening and an outlet opening,
    a main sheet material conveyor extending from said inlet opening to said outlet opening,
    means for supplying steam under pressure to said housing,
    and for sealing said sheet material against substantial escape of steam during entrance into said inlet opening and exit from said outlet opening, power-driven mechanism drivingly connected to said main conveyor in operating relationship therewith, and control means including a humping detection device disposed near said inlet opening and responsive to humping of the conveyed sheet material upward from said main conveyor above its normal path of travel thereon near said inlet opening for temporarily increasing the speed of said mechanism to temporarily speed up said main conveyor and consequently eliminate said humping by taking up any slack in the sheet material being deposited on said main conveyor.

2. An apparatus, according to claim 1, wherein said conveyor includes an endless flexible member and rotary elements supporting said member, and wherein said control means includes a photoelectric cell circuit connected in speed-controlling relationship with said mechanism and said humping detection device includes a photoelectric cell in said circuit and a light source projecting a humping-intercepting light beam over said main conveyor to said photoelectric cell in spaced relationship with said main conveyor above the normal path of travel of the conveyed material thereon.

3. An apparatus for rendering expanded polystyrene sheet material flexible comprising
an elongated approximately pressure-tight housing having an inlet opening and an outlet opening,
a main sheet material conveyor extending from said inlet opening to said output opening,
means for supplying steam under pressure to said housing,
means for sealing said sheet material against substantial escape of steam during entrance into said inlet opening and exit from said outlet opening, and a pair of opposed spaced feeding conveyors disposed in vertically-spaced relationship at said inlet opening and positioned to sealingly engage and transport and deposit the sheet material on said main conveyor.

4. An apparatus, according to claim 3, wherein said housing also includes an endless belt discharge conveyor spaced above said main conveyor and disposed in vertically spaced relationship with said main conveyor at said outlet opening and positioned to sealingly engage and press said material down against said main conveyor to discharge the sheet material through said outlet opening.

5. An apparatus, for rendering expanded polystyrene sheet material flexible, comprising
an elongated approximately pressure-tight housing having an inlet opening and an outlet opening,
a main sheet material conveyor extending from said inlet opening to said outlet opening,
means for supplying steam under pressure to said housing,
means for sealing said sheet material against substantial escape of steam during entrance into said inlet opening and exit from said outlet opening, and laterally-spaced edge sealing members are mounted in said inlet opening in sealing engagement with the opposite ends thereof and disposed apart from one another by a distance approximately equal to the desired width of the sheet, whereby to seal the opposite edges of the conveyed sheet material against said opposite ends and prevent lateral expansion and thinning out of the edge portions of the sheet.

6. An apparatus, according to claim 5, wherein a feeding conveyor including a pair of opposed endless belt conveyors disposed in vertically-spaced relationship is mounted at said inlet opening and positioned to sealingly engage and transport and deposit the sheet material on said main conveyor, and wherein said belt conveyors of said feeding belt conveyor have inlet sides with an approximately wedge-shaped space therebetween and wherein each edge contacting member is of approximately wedge-shaped cross-section and has concave approximately cylindrical surfaces entering said wedge-shaped space in the feeding conveyor near the opposite edge portions of the feeding conveyor.

7. An apparatus, according to claim 6, wherein the contact members have resilient pads thereon engaging the feeding conveyor.

8. An apparatus, according to claim 6, wherein means is provided for adjustably moving the edge contacting members toward and away from one another whereby to maintain edge contact with the plastic sheet while varying the width thereof.

9. An apparatus, according to claim 8, wherein means is provided for urging the edge contacting members toward the feeding conveyor while permitting lateral adjustment thereof.

10. An apparatus, for rendering expanded polystyrene sheet material flexible, comprising
an elongated approximately pressure-tight housing having an inlet opening and an outlet opening,
a main sheet material conveyor extending from said inlet opening to said outlet opening,
means for supplying steam under pressure to said housing,
means for sealing said sheet material against substantial escape of steam during entrance into said inlet opening and exit from said outlet opening, and press-down means disposed above the main conveyor effecting downwardly-pushing pressure upon the plastic sheet against said main conveyor, said press-down means including compressed gas ejection apparatus disposed above the main conveyor in spaced relationship therewith and having compressed gas escape orifices directed downwardly toward the main conveyor belt.

References Cited by the Examiner

UNITED STATES PATENTS

| | | | |
|---|---|---|---|
| 2,051,781 | 8/36 | Brown | 18—21 |
| 2,156,895 | 5/39 | Godat | 18—21 XR |
| 2,267,488 | 12/41 | Becker. | |
| 2,441,235 | 5/48 | Blair et al. | 18—4 |
| 2,518,806 | 8/50 | Muench | 18—47.5 |
| 2,590,757 | 3/52 | Cornelius et al. | 18—48 |
| 2,740,990 | 4/56 | Miller et al. | 18—4 |
| 2,794,212 | 6/57 | Warsack | 18—6 |
| 2,823,415 | 2/58 | Martin et al. | 18—1 |
| 2,926,389 | 3/60 | Garlington | 18—48 |
| 2,942,301 | 6/60 | Price et al. | 18—48 |
| 2,960,720 | 11/60 | Jodell | 18—1 |
| 2,998,501 | 8/61 | Edberg et al. | 18—4 |
| 3,002,248 | 10/61 | Willson | 25—41.5 |
| 3,017,666 | 1/62 | Fontien et al. | 18—21 XR |

FOREIGN PATENTS

| | | |
|---|---|---|
| 1,080,987 | 12/54 | France. |
| 223,166 | 10/24 | Great Britain. |
| 588,617 | 5/47 | Great Britain. |

OTHER REFERENCES

BASF publication, "New Methods for the Fabrication of Styropor," pp. 23–24 (Reprinted from "Der Plastvesarbeiter," 7, 242–250 (1955).

WILLIAM J. STEPHENSON, *Primary Examiner.*